United States Patent
Liu et al.

(10) Patent No.: US 12,433,619 B2
(45) Date of Patent: Oct. 7, 2025

(54) DISCHARGE CONTROLLABLE SHOCK WAVE BALLOON CATHETER SYSTEM

(71) Applicant: SONOSEMI MEDICAL CO., LTD., Shenzhen (CN)

(72) Inventors: Bin Liu, Shenzhen (CN); Jun Hu, Shenzhen (CN); Linsheng Hong, Shenzhen (CN); Bin Li, Shenzhen (CN)

(73) Assignee: SONOSEMI MEDICAL CO., LTD., Shenzhen (CN)

( * ) Notice: Subject to any disclaimer, the term of this patent is extended or adjusted under 35 U.S.C. 154(b) by 142 days.

(21) Appl. No.: 18/579,427

(22) PCT Filed: Nov. 18, 2021

(86) PCT No.: PCT/CN2021/131535
§ 371 (c)(1),
(2) Date: Jan. 15, 2024

(87) PCT Pub. No.: WO2023/284213
PCT Pub. Date: Jan. 19, 2023

(65) Prior Publication Data
US 2024/0335206 A1    Oct. 10, 2024

(30) Foreign Application Priority Data
Jul. 15, 2021    (CN) .................. 202110800723.X

(51) Int. Cl.
*A61B 17/22*     (2006.01)
*A61B 17/00*     (2006.01)

(52) U.S. Cl.
CPC .. *A61B 17/22022* (2013.01); *A61B 17/00234* (2013.01); *A61B 2017/00022* (2013.01);
(Continued)

(58) Field of Classification Search
CPC .......... A61B 17/00234; A61B 17/2202; A61B 17/22022; A61B 2017/00022;
(Continued)

(56) References Cited

U.S. PATENT DOCUMENTS 10,765,440 B2    9/2020   Tozzi
10,786,267 B2    9/2020   Wasdyke et al.
(Continued)

FOREIGN PATENT DOCUMENTS

CN    104582597 A    4/2015
CN    104582621 A    4/2015
(Continued)

OTHER PUBLICATIONS

Chinese Office Action corresponding to CN Application No. 202110800723.X; Issue Date, Dec. 6, 2024; 9 pages.
(Continued)

*Primary Examiner* — Mohamed G Gabr
(74) *Attorney, Agent, or Firm* — CANTOR COLBURN LLP

(57) ABSTRACT

The present application provides a discharge controllable shock wave balloon catheter system, which includes a shock wave therapy main unit (1), a balloon (2), a catheter, and a plurality of electrode pairs (6); an end of the catheter is arranged passing through the balloon (2), and an other end of the catheter is connected to the shock wave therapy main unit (1); the plurality of electrode pairs (6) are accommodated in the balloon (2) and mounted on the catheter; the plurality of electrode pairs (6) are arranged to be spaced apart along a length direction of the catheter; each of the plurality of electrode pairs (6) is independently connected to the shock wave therapy main unit (1), and the plurality of electrode pairs (6) are not connected to each other.

17 Claims, 2 Drawing Sheets

(52) U.S. Cl.
CPC ............... *A61B 2017/00172* (2013.01); *A61B 2017/00194* (2013.01); *A61B 2017/00199* (2013.01); *A61B 2017/00238* (2013.01); *A61B 2017/00305* (2013.01); *A61B 2017/00477* (2013.01); *A61B 2017/22025* (2013.01); *A61B 2017/22051* (2013.01)

(58) Field of Classification Search
CPC  A61B 2017/00172; A61B 2017/00194; A61B 2017/00199; A61B 2017/00238; A61B 2017/00305; A61B 2017/00477; A61B 2017/22021; A61B 2017/22025; A61B 2017/22051; A61B 2017/22062
See application file for complete search history.

(56) References Cited

U.S. PATENT DOCUMENTS

| | | |
|---|---|---|
| 2009/0312768 A1 | 12/2009 | Hawkins et al. |
| 2010/0114065 A1* | 5/2010 | Hawkins .......... A61B 17/22022 604/509 |
| 2014/0005576 A1* | 1/2014 | Adams .................. A61B 18/00 601/4 |
| 2016/0184570 A1 | 6/2016 | Grace et al. |
| 2017/0303946 A1* | 10/2017 | Ku .................. A61B 17/22029 |
| 2019/0029703 A1 | 1/2019 | Wasdyke et al. |
| 2019/0150961 A1 | 5/2019 | Tozzi |
| 2021/0085383 A1 | 3/2021 | Vo et al. |

FOREIGN PATENT DOCUMENTS

| | | |
|---|---|---|
| CN | 108452426 A | 8/2018 |
| CN | 109303586 A | 2/2019 |
| CN | 111388086 A | 7/2020 |
| CN | 112203601 A | 1/2021 |
| CN | 212491104 U | 2/2021 |
| CN | 113648048 A | 11/2021 |
| CN | 215899865 U | 2/2022 |

OTHER PUBLICATIONS

International Search Report for International Application No. PCT/CN2021/131535; Mailing Date, Apr. 13, 2022.
Written Opinion for International Application No. PCT/CN2021/131535; Mailing Date, Apr. 13, 2022.

* cited by examiner

DISCHARGE CONTROLLABLE SHOCK WAVE BALLOON CATHETER SYSTEM

CROSS REFERENCE TO RELATED APPLICATION

The present application is National Stage application filed under 35 USC 371 of International Patent Application No. PCT/CN2021/131535 with an international filling date of Nov. 18, 2021, and further claims priority of Chinese Patent application, with application Ser. No. 202110800723.X, submitted to CNIPA on Jul. 15, 2021: the entire contents each of which are incorporated in the present application by reference thereto.

TECHNICAL FIELD

The present application relates to the technical field of vascular calcification treatment device, and more particularly to a discharge controllable shock wave balloon catheter system.

BACKGROUND

Cardiovascular disease has always been one of the important factors of death in the world. In the past half century, with the development of medical knowledge and medical technology, the mortality rate of cardiovascular disease has been greatly reduced. Balloon dilatation angioplasty has played an important role in reducing the incidence and death of obstructive tubular artery disease. Traditional catheter interventional therapy usually involves percutaneous trans luminal angioplasty (PTA) to open calcified lesions in arterial and venous vessels. When the balloon dilates the calcified lesion in the vascular wall, the balloon will gradually release pressure until the calcified lesion bursts. While at the same time, the pressure accumulated in the balloon will be released instantaneously, causing the balloon to rapidly expand to its maximum size, which may cause some damage to the blood vessel wall.

In related technologies, the hydraulic and electric lithotripsy technology based on high-pressure underwater discharge has been clinically applied to destroy calcified deposits or stones in the urethra or biliary tract: therefore, high-pressure underwater discharge technology can also be applied to destroy calcification lesions in blood vessels. One or more pairs of discharge electrodes are placed in the angioplasty balloon to form a set of shock wave generator, and then the electrodes are connected to the high voltage pulse power supply host at the other end of the balloon dilating catheter. When the balloon is placed at the calcification lesion in the blood vessel, the host releases high-voltage discharge pulses to a plurality of discharge electrode pairs in the balloon, so that the shock wave generator in the balloon can release the shock wave outward, which can selectively destroy the calcification lesion in the blood vessel and avoid the damage to the blood vessel at the same time.

At present, the shock wave balloon catheter system in the industry mostly uses more than 2 or 4 discharge electrode pairs, and the discharge electrode pairs are connected in series. Due to the limited energy of the high-voltage pulse power supply host, which can generally support only 3 series discharge electrode pairs for synchronous high-voltage discharge in time. If there are more than 3 discharge electrode pairs in the balloon, the discharge electrode pairs need to be divided into several groups. The high-voltage pulse power supply host releases high-voltage discharge pulses to each group of discharge electrode pairs successively through the time-division multiplexing switch. This asynchronous high-voltage discharge mode in time greatly reduces the efficiency of releasing shock waves of the balloon, even only half the efficiency of the synchronous discharge mode of the electrode pairs, thus the treatment time of vascular calcified plaque was significantly prolonged.

For severe vascular calcification lesions, especially the superficial femoral artery and iliac artery of lower limbs, the length of calcification lesions is usually more than 10 cm, and the calcification degree is not the same in the length direction, and the severe area of calcification is often in a certain section or a cross-section area. If the discharge intensities of the electrode pairs are the same, it is easy to have a part of the calcification not treated, or a part of the normal tissue is overtreated. Therefore, the distribution of shock wave sound field transmitted by the outer wall of the balloon to calcification lesions is not the more uniform the better. The connection mode between electrodes and the discharge control mode will directly affect the distribution of shock wave sound field, while the shock wave sound field transmitted by the shock wave balloon using a plurality of sets of series discharge electrodes can only be uniformly distributed, which usually takes about 140 seconds for treatment. Therefore, in order to improve the treatment efficiency of vascular calcified plaque and reduce the operation time, it is necessary to further improve the connection mode and control mode of the internal discharge electrode pairs of the shock wave balloon, so as to achieve differentiated treatment for a patient and achieve the best treatment effect.

SUMMARY

The object of an embodiment of the present application is to provide a discharge controllable shock wave balloon catheter system, to solve technical problems such as incomplete or excessive treatment of severe vascular calcification lesions and low treatment efficiency of vascular calcification plaques in prior art.

In order to achieve above object, the technical solution adopted by the present application is to provide a discharge controllable shock wave balloon catheter system, which includes: a shock wave therapy main unit, a balloon, a catheter, and a plurality of electrode pairs: an end of the catheter is arranged passing through the balloon, and an other end of the catheter is connected to the shock wave therapy main unit: the plurality of electrode pairs are accommodated in the balloon and mounted on the catheter: the plurality of electrode pairs are arranged to be spaced apart along a length direction of the catheter: each of the plurality of electrode pairs is independently connected to the shock wave therapy main unit, and the plurality of electrode pairs are not connected to each other.

In an embodiment, the shock wave therapy main unit includes a plurality of pulse switch modules, and a number of the plurality of pulse switch modules is less than or equal to a number of the plurality of electrode pairs: one of the plurality of pulse switch modules is electrically connected to one of the plurality of electrode pairs in a one-to-one correspondence by a metal wire, or one of the plurality of pulse switch modules is electrically connected to two or more of the plurality of electrode pairs through metal wires.

In an embodiment, each of the plurality of pulse switch modules includes a high voltage switch circuit using IGBT or MOS tube, a time division multiplexing switch circuit, a drive circuit, and a plurality of energy storage capacitors: the plurality of energy storage capacitors are configured for providing instantaneous currents to the plurality of electrode pairs during a high voltage pulse discharge process: the plurality of pulse switch modules are configured for outputting high-voltage discharge pulse signals to the plurality of electrode pairs: one of the plurality of pulse switch modules supports releasing high voltage discharge pulses to the plurality of electrode pairs in a time asynchronous mode: the plurality of pulse switch modules support releasing the high voltage discharge pulses to the plurality of electrode pairs in a time synchronization mode; and a plurality of pulse frequencies of the plurality of pulse switch modules can be individually adjusted.

In an embodiment, each of the plurality of electrode pairs includes an outer electrode, an insulating layer and two inner electrodes: the two inner electrodes are arranged on an outer wall of the catheter: the insulating layer is arranged between the two inner electrodes and the outer electrode: the two inner electrodes of one of the plurality of electrode pairs are electrically connected to one of the plurality of pulse switch modules through the metal wires, individually, to form an electronic loop that is independently controllable and is configured to perform the high voltage pulse discharge process.

In an embodiment, thicknesses of the outer electrodes of the electrode pairs distributed at both ends of the catheter is not greater than thicknesses of the outer electrodes of the electrode pairs distributed at a middle of the catheter.

In an embodiment, the shock wave therapy main unit is a multi-channel high-voltage pulse power supply; and a number of channels of the multi-channel high-voltage pulse power supply is the same as a number of the plurality of pulse switch modules.

In an embodiment, a plurality of the metal wires are placed in the catheter in a manner of being wound with each other or being bound by a heat shrink tube to control and reduce a parasitic capacitance.

In an embodiment, the outer electrode is arranged in a ring-shaped structure, and at least two discharge holes are arranged on the outer electrode, and the at least two discharge holes are distributed along a circumference direction of the outer electrode.

In an embodiment, the shock wave balloon catheter system further includes an operating handle: the plurality of metal wires are electrically connected with the plurality of pulse switch modules through the operating handle.

In an embodiment, the shock wave therapy main unit further includes a power module electrically connected with the plurality of pulse switch modules.

In an embodiment, the shock wave therapy main unit further includes a plurality of power modules, and the plurality of power modules are electrically connected to the plurality of pulse switch modules in a one-to-one correspondence.

In an embodiment, the shock wave therapy main unit further includes a control module, a display module and a power supply module: the control module is electrically connected with the power supply module, the plurality of pulse switch modules, the display module and the power supply module respectively.

In an embodiment, the power module includes a high voltage DC power supply circuit and a state monitoring circuit, and the high voltage DC power supply circuit is configured for outputting a high voltage DC signal to the plurality of power supply modules; the state monitoring circuit is configured for collecting an output current condition of the power module and reporting a working state to the control module.

In an embodiment, the control module is an X86 control system or an MCU processing system: the power supply module is any one or more combinations of a lithium iron phosphate, a lithium titanate, and a ternary lithium battery pack; and the display module is an LCD or LED display screen and a drive circuit of the LCD or LED display screen.

In an embodiment, the power supply module, the control module, the display module, the power module, and the plurality of pulse switch modules are integrated on a PCB board, or a split modular design is adopted and modules are electrically connected by wires.

In an embodiment, a distance between adjacent two electrode pairs of the plurality of electrode pairs is 5-10 mm.

In an embodiment, a thickness of the outer electrode is 0.05 mm-0.1 mm.

In an embodiment, a distance between the inner electrodes and the outer electrode is 0.03 mm-0.13 mm.

The beneficial effects of the shock wave balloon catheter system provided in the present application are: compared with the prior art, the present application provides a plurality of electrode pairs, the sizes of the plurality of electrode pair is not exactly the same, and the discharge parameters that can be matched are also different. In the case of uneven distribution of the calcification degree of blood vessel, the phenomenon of incomplete or excessive treatment can be avoided by configuring electrode pairs with different energies, and it is more conducive to achieving precise treatment of calcified blood vessels. One pulse switch module is electrically connected to one electrode pair through a metal wire in a one-to-one correspondence, or one pulse switch module is electrically connected to more than one electrode pairs through a metal wire, and the size and frequency of the shock wave energy released by each electrode pair can be independently controlled, so that the plurality of electrode pairs can simultaneously perform high-voltage pulse discharge in time, and can also asynchronously perform high-voltage pulse discharge in time, so as to increase the flexibility of discharge control mechanism and significantly improve the discharge efficiency of shock wave balloon, and the surgical treatment time of vascular calcification lesions can be greatly reduced, so that the average treatment time can be shortened to two-thirds or even shorter than the original technology.

BRIEF DESCRIPTION OF THE DRAWINGS

In order to explain the embodiments of the present application more clearly, a brief introduction regarding the accompanying drawings that need to be used for describing the embodiments of the present application or the prior art is given below: it is obvious that the accompanying drawings described as follows are only some embodiments of the present application, for those skilled in the art, other drawings can also be obtained according to the current drawings on the premise of paying no creative labor.

Figure 1:
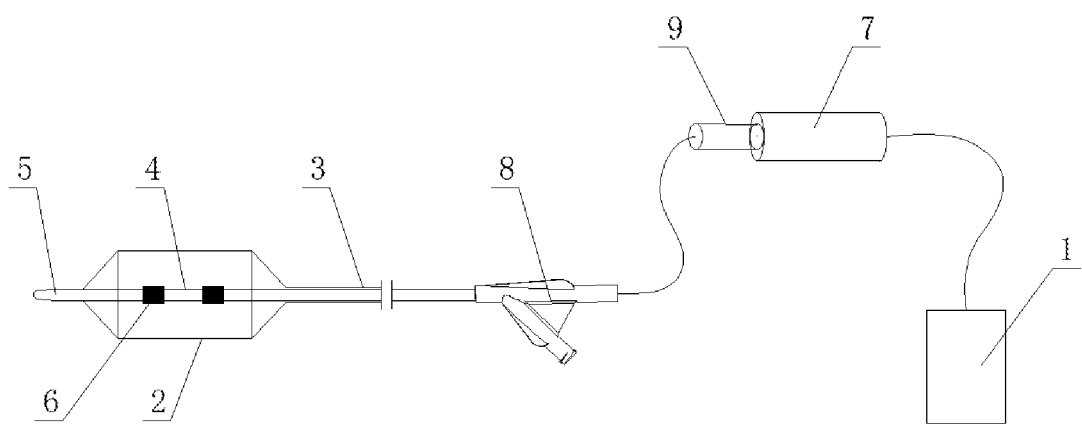
FIG. 1 is a structural schematic diagram of a shock wave balloon catheter system provided by an embodiment of the present application.

1—shock wave therapy main unit; 2—balloon; 3—proximal catheter; 4—inner tube; 5—distal catheter; 6—electrode pair; 61—first inner electrode; 62—second inner electrode; 63—outer electrode; 64—insulating layer; 65—discharge hole; 7—operating handle; 8—catheter seat; 9—catheter connector; 10—common metal wire; 11—first metal wire; 12—second metal wire; 13—third metal wire; 14—fourth metal wire.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

As shown in FIGS. 1 to 6, which are used for an explanation of the shock wave balloon catheter system provided in the embodiment of the present application. The shock wave balloon catheter system includes a shock wave therapy main unit 1, a balloon 2, a catheter, and a plurality of electrode pairs 6; the catheter includes a proximal catheter 3, an inner tube 4, and a distal catheter 5 (the catheter can also be a whole) connected in sequence. The proximal catheter 3 is connected with the shock wave therapy main unit 1, and the inner tube 4 is accommodated in the balloon 2. The electrode pairs 6 are arranged on the inner tube 4; the plurality of electrode pairs are arranged along the length direction of the inner tube 4. The sizes of the plurality of electrode pairs are not exactly the same, the larger the size of the electrode pair, the larger the discharge parameters can be matched, and the higher the reliability of the electrode pair. The shock wave therapy main unit 1 includes a plurality of pulse switch modules, the number of pulse switch modules is less than or equal to the number of electrode pairs: one pulse switch module is electrically connected to one electrode pair 6 through a metal wire in one-to one correspondence, or the same pulse switch module is electrically connected to more than one electrode pairs 6 through a metal wire, and the plurality of electrode pairs 6 are not connected in series. For example, six electrode pairs and three pulse switch modules are arranged, and every two electrode pairs are electrically connected to one pulse switch module, and the two electrode pairs electrically connected to the same pulse switch module are not connected in series.

Comparing to the prior art, the shock wave balloon catheter system provided in the present application provides a plurality of electrode pairs, the sizes of the plurality of electrode pair are not exactly the same, and the discharge parameters that can be matched are also different. In the case of uneven distribution of the calcification degree of blood vessel, the phenomenon of incomplete or excessive treatment can be avoided by configuring electrode pairs with different energies, and it is more conducive to achieving precise treatment of calcified blood vessels. One pulse switch module is electrically connected to one electrode pair through a metal wire in a one-to-one correspondence, or the same pulse switch module is electrically connected to more than one electrode pairs through a metal wire, and the size and frequency of the shock wave energy released by each electrode pair can be independently controlled, so that the plurality of electrode pairs can simultaneously perform high-voltage pulse discharge in time, and can also asynchronously perform high-voltage pulse discharge in time, so as to increase the flexibility of discharge control mechanism and significantly improve the discharge efficiency of shock wave balloon, and the surgical treatment time of vascular calcification lesions can be greatly reduced, so that the average treatment time can be shortened to two-thirds or even shorter than the original technology.

In one embodiment of the present application, the shock wave therapy main unit 1 is a multi-channel high-voltage pulse power supply: the number of channels of the multi-channel high-voltage pulse power supply is the same as the number of pulse switch modules. The multi-channel high-voltage pulse power supply can meet the energy requirements of the plurality of electrode pairs such as more than three electrode pairs, and ensure the normal high-voltage discharge to release shock waves.

Figure 2:
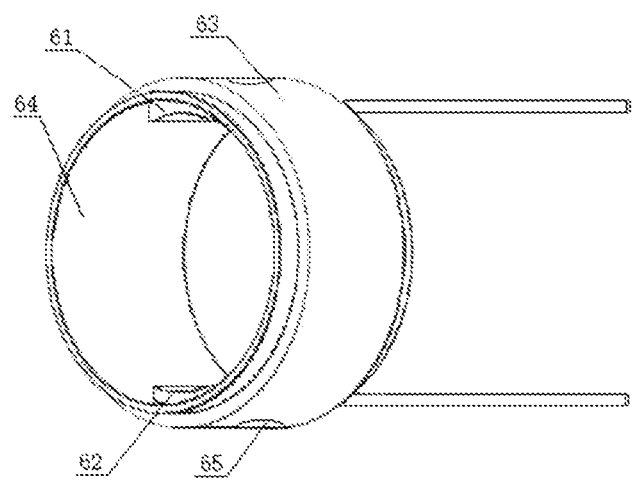
FIG. 2 is a structural schematic diagram of an electrode pair provided by an embodiment of the present application.
Figure 3:
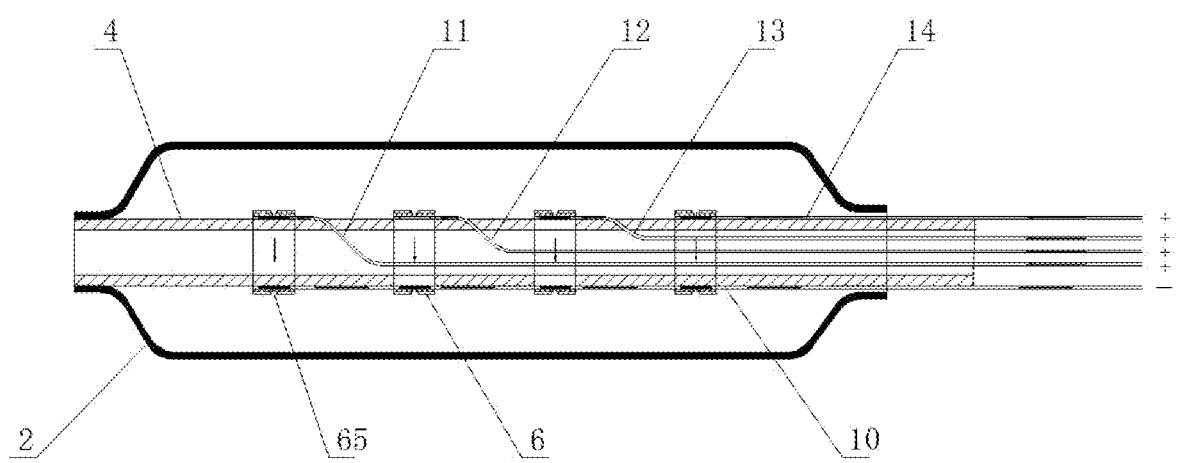
FIG. 3 is a schematic diagram of a plurality of electrode pairs connected provided by an embodiment of the present application.

In one embodiment of the present application, as shown in FIGS. 2 and 3, each of the plurality of electrode pairs 6 includes a first inner electrode 61, a second inner electrode 62, an outer electrode 63, and an insulating layer 64: the first inner electrode 61 and the second inner electrode 62 are mounted on the outer wall of the inner tube 4: the insulating layer is arranged between the two inner electrodes and the outer electrode 63, the distance between the inner electrodes and the outer electrode is 0.03 mm-0.13 mm, the distance between the inner electrodes and the outer electrode affects the discharge intensity, the inner electrode and the outer electrode are easy to be conductive when the distance is too small, and the discharge occurs at a lower voltage, which results in weak discharge energy: on the contrary, if the distance between the inner electrodes and the outer electrode is too large, the inner electrode and the outer electrode cannot be conductive under a preset discharge pulse width, which results in discharge failure, and the first inner electrode 61 is electrically connected to the pulse switch module through a wire. The second inner electrode 62 is electrically connected to the pulse switch module through a wire. The current flows from the metal wire to the first inner electrode 61, and then flows to the outer electrode 63, and then flows from the outer electrode 63 to the second inner electrode 62, and finally flows back to the pulse switch modules through another metal wire, and the inner electrodes of one of the electrode pairs are electrically connected to one pulse switch module through the metal wire individually, to form an electronic loop that can be independently controlled and high-voltage pulse discharge; the arrows in FIG. 3 indicate the current direction. In one embodiment of the present application, as shown in FIGS. 2 and 3, the outer electrode 63 is arranged in a ring-shaped structure. The outer electrode 63 is provided with two discharge holes 65, one inner electrode corresponds to one of the two discharge holes, the two discharge holes are symmetrically distributed along the circumference direction of the outer electrode 63, the insulating layer 64 is also arranged in a ring-shaped structure, the shape matches the outer electrode 63, and the insulating layer 64 is provided with through holes corresponding to the two discharge holes 65. The number of discharge holes can also be three or more, one inner electrode corresponds to a plurality of discharge holes, and the energy generated by the shock wave can be released by providing the plurality of discharge holes. The plurality of discharge holes are evenly distributed along the circumference direction, which can release shock wave energy evenly to all parts of balloon 2 and reduce local damage to blood vessels.

In one embodiment of the present application, the number of electrode pairs can be two or three or even more, as shown in FIG. 3, the embodiment provides four electrode pairs, which are assembled on the inner tube coaxial along the length direction of the inner tube. The distance between adjacent two electrode pairs is 5-10 mm, and the distance between the electrode pairs is smaller, which is conducive to the concentration of shock wave energy. The shock wave energy released by the discharge of the electrode pairs gradually attenuates with the propagation distance. In order to avoid the shock wave energy at the distance of the electrode pairs from too low and cannot be broken and calcified, so the distance is not more than 10 mm. However, the electrode density is too large, which results in the range covered by the shock wave is too short under the same number of electrode pairs, thus the distance between the electrode pairs is preferably 5 mm to 10 mm. The sizes of the electrode pairs are not exactly the same, the thicker the outer electrode can match the larger the discharge parameter, the higher the reliability of the electrode, the thickness of the outer electrode is 0.05 mm-0.1 mm: the optimizing of thickness of the outer electrode and increasing the thickness of the outer electrode are conducive to improve the reliability of the electrode. However, the outer electrode being arranged too thick will cause the profile size of the balloon to be too large and affect the passing performance, thus the preferred thickness range of the electrode is 0.05 mm-0.1 mm. As a preferred solution, the thicknesses of the outer electrodes distributed in the electrode pairs at both ends of the inner tube is not greater than the thickness of the outer electrode distributed at the middle of the inner tube, which can improve the passability of the balloon. The first inner electrodes of the four electrode pairs are connected with the pulse switch module of the shock wave therapy main unit through a common metal conductor 10; the second inner electrodes of the four electrode pairs are connected with the corresponding pulse switch modules through the first metal wire 11, the second metal wire 12, the third metal wire 13 and the fourth metal wire 14, so that the four electrode pairs are independent of each other and can be controlled separately. The plurality of metal wires (referred to in the embodiment as common metal wire 10, the first metal wire 11, the second metal wire 12, the third metal wire 13, and the fourth metal wire 14) are placed in the catheter in a manner of being wound with each other or being bound by a heat shrink tube to control and reduce parasitic capacitance.

The shock wave intensity emitted by the plurality of electrode pairs in the balloon has the characteristic of adjustable intensity. From the perspective of clinical cases, if the blood vessels are discontinuous and have varying degrees of calcification intensity in the length direction of the blood vessels; and if the discharge intensities of the electrode pairs are the same, it is easy to have a part of the calcification is not treated, or a part of the normal tissue is overtreated. Therefore, the shock wave therapy main unit and electrode pairs provided in the present application can realize independent control of electrode pair discharge, and the discharge of a single electrode pair can be adjusted at any time.

Figure 4:
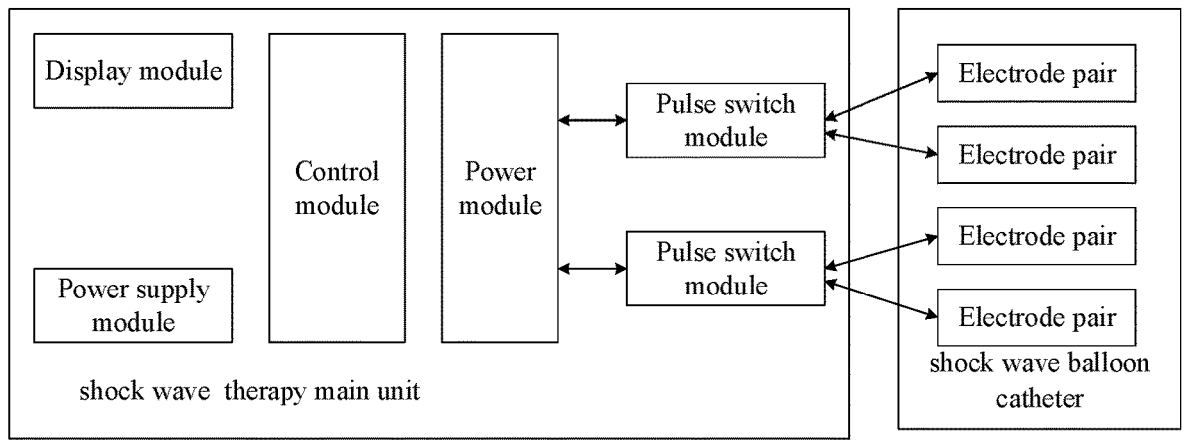
FIG. 4 is a first block diagram of a shock wave therapy main unit system.

In one embodiment of the present application, as shown in FIG. 4, the shock wave therapy main unit 1 includes a power supply module, the power supply module electrically connected to two pulse switch modules: each of the two pulse switch modules is electrically connected to two electrode pairs. The pulse switching module includes an IGBT or MOS tube (metal-oxide semiconductor field-effect transistor) switch circuit, a time division multiplexing switch circuit, a drive circuit and a plurality of energy storage capacitors, the plurality of energy storage capacitors are used to provide instantaneous current to the electrode pairs during the high-voltage pulse discharge process. The pulse switch module is used to output high-voltage discharge pulse signals to the electrode pairs, with a frequency ranging from 0.5 Hz to 4 Hz. The pulse frequency of the pulse switch module can be adjusted independently within this range, thus the shock wave therapy main unit can also adjust the discharge energy for each electrode, three grades including a high grade, a medium grade, and a low grade (which is not limited to three grades, and can also be four grades, five grades, or even infinitely adjustable) of discharge energy can be set. The default state is that the output energy of each electrode pair of the shock wave therapy main unit is arranged as a medium grade. When the output energy is needed to be adjusted, the user can adjust the energy of each electrode independently by adjusting the discharge energy on the interface of the shock wave therapy main unit, and increase or decrease the discharge energy of a certain electrode, so as to adjust the energy of the shock wave.

In clinical use, the calcified blood vessels can be analyzed repeatedly to find the distribution of calcification degree, and then the discharge parameters of the shock wave therapy main unit can be adjusted to optimize the distribution of shock wave intensity in the length direction of the balloon, so as to achieve the purpose of accurate treatment of calcification, thus the difficulty of surgery is reduced and the safety and validity of surgery is improved.

Figure 5:
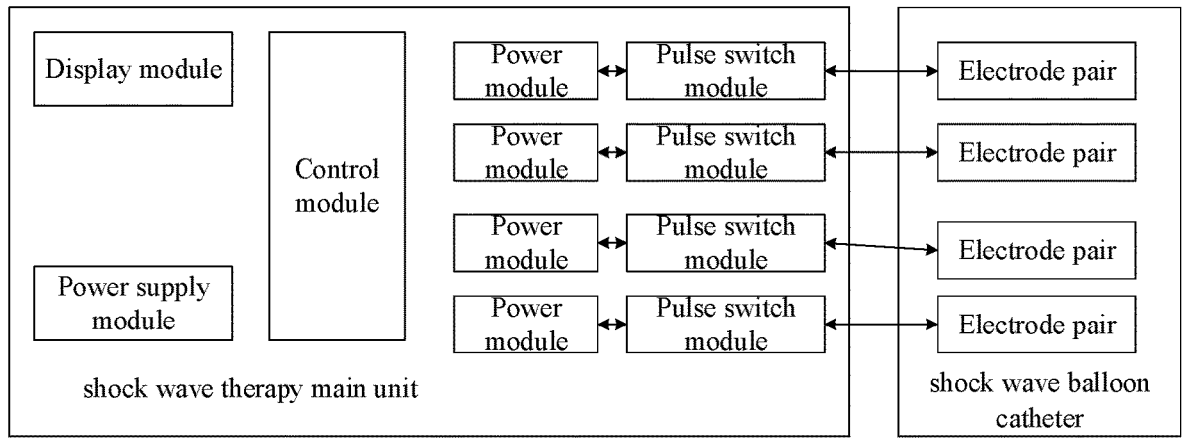
FIG. 5 is a second block diagram of a shock wave therapy main unit system.

In another embodiment of the present application, as shown in FIG. 5, the shock wave therapy main unit 1 includes four power modules, each power module is electrically connected to one pulse switch module, and each pulse switch module is electrically connected to one electrode pair. By arranging a plurality of power modules, the voltage of each power module can be arranged independently, which is more conducive to the independent control of the plurality of electrode pairs.

In another embodiment of the present application, the power module comprises a high voltage DC power circuit and a state monitoring circuit, and the high voltage DC power circuit is used to output the high voltage DC signal to the pulse switch module: the status monitoring circuit is used to collect the output current of the power module and reports the working state to the control module, and the voltage of the power module ranges from 500V to 5000V.

In one embodiment of the present application, the shock wave therapy main unit 1 further includes a control module, a power supply module and a display module. The control module is electrically connected to the power module, the pulse switch module, the power supply module, and the display module. The power supply module is any one or more combinations of a lithium iron phosphate, a lithium titanate, and a ternary lithium battery pack. The display module is used to display the parameters of the system, such as the size of DC voltage, pulse signal frequency and so on. The control module is X86 control system or a MCU(microcontrol unit) processing system used to control the modules in the system.

In one embodiment of the present application, the power supply module, the control module, the display module, the power module and the pulse switch module can be integrated on a single PCB board, or they may adopt a split modular design is adopted and modules are electrically connected by wires.

In one embodiment of the present application, as shown in FIG. 1, the shock wave balloon catheter system further includes an operating handle 7: the catheter is connected to the shock wave therapy main unit 1 through the operating handle 7, and the catheter is connected to the operating handle 7 through the catheter seat 8 and the catheter connector 9 in turn; and the operating handle 7 is arranged to facilitate the operating of the user.

The shock wave balloon catheter system provided in the present application supports a flexible discharge control mechanism capable of synchronous or asynchronous high voltage discharge by individually controlling each electrode pair.

Figure 6:
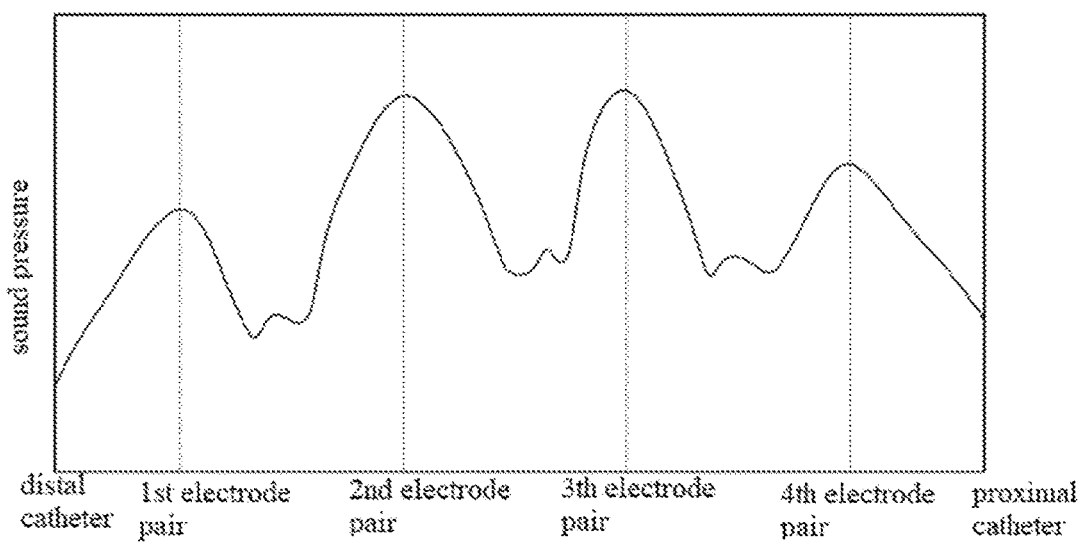
FIG. 6 is a schematic diagram of a shock wave pressure released by four electrode pairs on synchronous high voltage discharge.

The synchronous high-voltage discharge means that the plurality of electrode pairs discharge at the same time. FIG. 6 provides the implementation of four electrode pairs. In the FIG. 6, the proximal end of the balloon refers to the end close to the shock wave therapy main unit 1, while the distal end of the balloon refers to the end far away from the shock wave therapy main unit 1. The thicknesses of the outer electrodes of the second electrode pair and the third electrode pair are greater than the thicknesses of the outer electrodes of the first electrode pair and the fourth electrode pair, the power modules and pulse switch modules that control the discharge of the four electrode pairs are independently arranged in a one-to-one correspondence according to the vascular calcification lesion condition of the patient, the second electrode pair and the third electrode pair arranged in the middle can generate stronger shock pressure in the center of the balloon compared with the two sides of the balloon (which is not limited to the waveform shown in FIG. 6).

The asynchronous high voltage discharge means that the plurality of electrode pairs discharge asynchronously in time: the power modules and pulse switch modules that control the discharge of the four electrode pairs are independently arranged in a one-to-one correspondence according to the vascular calcification lesion condition of the patient, especially for vascular calcification lesion with a longer length (such as more than 10 cm), so as to produce a more uniform shock wave pressure around the balloon.

Differentiated discharge control strategies can better develop targeted treatment plans for different conditions of vascular calcification lesion. By enabling each electrode pair to perform high voltage discharge independently, the shock wave balloon can generate more shock wave energy per unit time to achieve the purpose of improving the treatment efficiency.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A discharge controllable shock wave balloon catheter system, comprising:
   a shock wave therapy main unit (1),
   a balloon (2),
   a catheter, and
   a plurality of electrode pairs (6);
   wherein an end of the catheter is arranged passing through the balloon (2), and an other end of the catheter is connected to the shock wave therapy main unit (1); the plurality of electrode pairs (6) are accommodated in the balloon (2) and mounted on the catheter; the plurality of electrode pairs (6) are arranged to be spaced apart along a length direction of the catheter; each of the plurality of electrode pairs (6) is independently connected to the shock wave therapy main unit (1), and the plurality of electrode pairs (6) are not connected to each other;
   wherein the shock wave therapy main unit (1) comprises a plurality of pulse switch modules, each of the plurality of pulse switch modules is independently connected, and a number of the plurality of pulse switch modules is less than or equal to a number of the plurality of electrode pairs (6); one of the plurality of pulse switch modules is electrically connected to one of the plurality of electrode pairs (6) by a metal wire in a one-to-one correspondence, or one of the plurality of pulse switch modules is electrically connected to two or more of the plurality of electrode pairs (6) by metal wires; and a magnitude and a frequency of a shock wave energy released by each of the plurality of electrode pairs controlled by a corresponding pulse switch module are different.

2. The shock wave balloon catheter system according to claim 1, wherein each of the plurality of pulse switch modules comprises a high voltage switch circuit using IGBT or MOS tube, a time division multiplexing switch circuit, a drive circuit, and a plurality of energy storage capacitors; the plurality of energy storage capacitors are configured for providing instantaneous currents to the plurality of electrode pairs (6) during a high voltage pulse discharge process; the plurality of pulse switch modules are configured for outputting high-voltage discharge pulse signals to the plurality of electrode pairs (6); one of the plurality of pulse switch modules supports releasing high voltage discharge pulses to the plurality of electrode pairs (6) in a time asynchronous mode; the plurality of pulse switch modules support releasing the high voltage discharge pulses to the plurality of electrode pairs (6) in a time synchronization mode; and a plurality of pulse frequencies of the plurality of pulse switch modules are individually adjusted.

3. The shock wave balloon catheter system according to claim 2, wherein each of the plurality of electrode pairs (6) comprises an outer electrode (63), an insulating layer (64) and two inner electrodes; the two inner electrodes are arranged on an outer wall of the catheter; the insulating layer (64) is arranged between the two inner electrodes and the outer electrode (63); the two inner electrodes of one of the plurality of electrode pairs (6) are electrically connected to one of the plurality of pulse switch modules through the metal wires individually, to form an electronic loop that is independently controllable and is configured to perform the high voltage pulse discharge process.

4. The shock wave balloon catheter system according to claim 3, wherein sizes of the plurality of electrode pairs (6) are not exactly the same, thicknesses of the outer electrodes of the plurality of electrode pairs (6) distributed at both ends of the catheter are not greater than thicknesses of the outer electrodes of the plurality of electrode pairs (6) distributed at a middle of the catheter.

5. The shock wave balloon catheter system according to claim 4, wherein a thickness of the outer electrode is 0.05 mm-0.1 mm.

6. The shock wave balloon catheter system according to claim 3, wherein a distance between the inner electrodes and the outer electrode is 0.03 mm-0.13 mm.

7. The shock wave balloon catheter system according to claim 1, wherein the shock wave therapy main unit (1) is a multi-channel high-voltage pulse power supply; and a number of channels of the multi-channel high-voltage pulse power supply is the same as a number of the plurality of pulse switch modules.

8. The shock wave balloon catheter system according to claim 4, wherein a plurality of the metal wires are placed in the catheter in a manner of being wound with each other or being bound by a heat shrink tube to control and reduce a parasitic capacitance.

9. The shock wave balloon catheter system according to claim 8, wherein the outer electrode (63) is arranged in a ring-shaped structure, and at least two discharge holes (65) are arranged on the outer electrode (63), and the at least two discharge holes (65) are distributed along a circumference direction of the outer electrode (63).

10. The shock wave balloon catheter system according to claim 9, further comprising an operating handle (7); the plurality of metal wires are electrically connected with the plurality of pulse switch modules through the operating handle (7).

11. The shock wave balloon catheter system according to claim 10, wherein the shock wave therapy main unit (1) further comprises a power module electrically connected with the plurality of pulse switch modules.

12. The shock wave balloon catheter system according to claim 10, wherein the shock wave therapy main unit (1) further comprises a control module, a display module and a power supply module; and the control module is electrically connected with the power supply module, the plurality of pulse switch modules, the display module and the power supply module respectively.

13. The shock wave balloon catheter system according to claim 12, wherein the power module comprises a high voltage DC power supply circuit and a state monitoring circuit, and the high voltage DC power supply circuit is configured for outputting a high voltage DC signal to the plurality of power supply modules; and the state monitoring circuit is configured for collecting an output current condition of the power module and reporting a working state to the control module.

14. The shock wave balloon catheter system according to claim 12, wherein the control module is an X86 control system or an MCU processing system; the power supply module is any one or more combinations of a lithium iron phosphate, a lithium titanate, and a ternary lithium battery pack; and the display module is an LCD or LED display screen and a drive circuit of the LCD or LED display screen.

15. The shock wave balloon catheter system according to claim 14, wherein the power supply module, the control module, the display module, the power module, and the plurality of pulse switch modules are integrated on a PCB board;
or alternatively, a split modular design is adopted and modules are electrically connected by wires.

16. The shock wave balloon catheter system according to claim 10, wherein the shock wave therapy main unit (1) further comprises a plurality of power modules, and the plurality of power modules are electrically connected to the plurality of pulse switch modules in a one-to-one correspondence.

17. The shock wave balloon catheter system according to claim 1, wherein a distance between adjacent two electrode pairs of the plurality of electrode pairs (6) is 5 mm-10 mm.

* * * * *